(12) United States Patent
Wieclawski

(10) Patent No.: US 8,608,245 B2
(45) Date of Patent: Dec. 17, 2013

(54) SEAT LATCH

(75) Inventor: Stanislaw Andrzej Wieclawski, Hohenkammer (DE)

(73) Assignee: Lear Corporation, Southfield, MI (US)

( * ) Notice: Subject to any disclaimer, the term of this patent is extended or adjusted under 35 U.S.C. 154(b) by 47 days.

(21) Appl. No.: 13/062,829

(22) PCT Filed: Oct. 28, 2008

(86) PCT No.: PCT/US2008/081399
§ 371 (c)(1),
(2), (4) Date: Mar. 8, 2011

(87) PCT Pub. No.: WO2010/050925
PCT Pub. Date: May 6, 2010

(65) Prior Publication Data
US 2011/0215627 A1    Sep. 8, 2011

(51) Int. Cl.
*A47C 7/02* (2006.01)
(52) U.S. Cl.
USPC ............ 297/378.13; 296/65.16; 292/137; 292/340; 292/DIG. 61
(58) Field of Classification Search
USPC ............ 297/378.1, 378.12, 378.13; 292/137, 292/138, 145, 153, 219, 220, 227, 228, 292/DIG. 61; 296/65.16
See application file for complete search history.

(56) References Cited

U.S. PATENT DOCUMENTS

| 3,905,624 A | 9/1975 | Fujita |
| 4,484,776 A | 11/1984 | Gokimoto et al. |
| 4,607,884 A | 8/1986 | Heling |
| 4,634,180 A | 1/1987 | Zaveri et al. |
| 4,639,040 A | 1/1987 | Fujita et al. |
| 4,720,143 A | 1/1988 | Schwartz et al. |
| 4,721,338 A | 1/1988 | Kondo |
| 4,736,985 A | 4/1988 | Fourrey et al. |
| 4,765,682 A * | 8/1988 | Satoh ................ 297/378.13 |
| 4,866,820 A | 9/1989 | Hassmann |
| 4,869,541 A | 9/1989 | Wainwright |
| 4,880,264 A | 11/1989 | Yamazaki et al. |
| 4,881,767 A | 11/1989 | Kondo |
| 4,900,088 A | 2/1990 | Bechtle et al. |
| 4,904,003 A | 2/1990 | Yamazaki et al. |

(Continued)

FOREIGN PATENT DOCUMENTS

| DE | 202005006992 U1 | 9/2006 |
| DE | 19639610 B4 | 7/2007 |

OTHER PUBLICATIONS

International Preliminary Report on Patentability for corresponding Application No. PCT/US2008/081399, mailed May 12, 2011, 7 pages.

(Continued)

*Primary Examiner* — David Dunn
*Assistant Examiner* — Timothy J Brindley
(74) *Attorney, Agent, or Firm* — Brooks Kushman P.C.

(57) ABSTRACT

A seat latch for use in retaining a seat back or other element in a locked position. The seat latch may include a lifting element configured to lift a locking fork into locking engagement with a retaining hook. The lifting element may be a spring that experiences increased tension when the seat back is folded into an upright position. The increased tension can cause the spring to lock the seat back relative to the retaining hook.

20 Claims, 4 Drawing Sheets

(56) References Cited

U.S. PATENT DOCUMENTS

| | | | |
|---|---|---|---|
| 5,383,699 A * | 1/1995 | Woziekonski et al. | 296/65.09 |
| 5,419,616 A | 5/1995 | Paetzold | |
| 5,662,369 A | 9/1997 | Tsuge | |
| 5,741,046 A | 4/1998 | Leuchtmann et al. | |
| 5,762,401 A | 6/1998 | Bernard | |
| 5,879,043 A | 3/1999 | Radue et al. | |
| 5,984,419 A | 11/1999 | Partington et al. | |
| 6,123,379 A | 9/2000 | Yamada et al. | |
| 6,132,000 A | 10/2000 | Tanaka | |
| 6,158,800 A | 12/2000 | Tsuge et al. | |
| 6,302,484 B1 | 10/2001 | Araki et al. | |
| 6,341,820 B1 | 1/2002 | Kimura et al. | |
| 6,345,856 B1 | 2/2002 | Minai | |
| 6,595,587 B2 | 7/2003 | Konishi et al. | |
| 6,733,078 B1 | 5/2004 | Zelmanov | |
| 6,736,438 B1 | 5/2004 | Wieclawski | |
| 6,860,565 B2 | 3/2005 | Spence, Jr. | |
| 6,945,585 B1 | 9/2005 | Liu et al. | |
| 7,032,973 B2 | 4/2006 | Reubeuze | |
| 7,044,552 B2 | 5/2006 | Müller et al. | |
| 7,134,716 B2 | 11/2006 | Wieclawski | |
| 7,152,900 B2 | 12/2006 | Trombley et al. | |
| 7,152,923 B2 | 12/2006 | Charras et al. | |
| 7,156,461 B2 | 1/2007 | Bolte et al. | |
| 7,264,293 B2 | 9/2007 | Fischer et al. | |
| 7,309,095 B2 | 12/2007 | O'Connor | |
| 7,377,584 B2 | 5/2008 | Griswold et al. | |
| 7,404,605 B2 | 7/2008 | Inoue et al. | |
| 7,490,908 B2 | 2/2009 | Wieclawski | |
| 8,118,342 B2 * | 2/2012 | Kokubo et al. | 296/65.16 |
| 8,128,135 B2 * | 3/2012 | Maeta et al. | 292/216 |
| 2003/0080601 A1 | 5/2003 | Charras et al. | |
| 2004/0100133 A1 | 5/2004 | Wieclawski | |
| 2006/0170270 A1 | 8/2006 | Inoue et al. | |
| 2007/0052255 A1 | 3/2007 | O'Connor | |
| 2007/0052256 A1 | 3/2007 | Trombley et al. | |
| 2007/0090670 A1 | 4/2007 | Garland | |
| 2008/0296949 A1 | 12/2008 | Wieclawski | |
| 2009/0008981 A1 | 1/2009 | Wieclawski | |
| 2009/0021067 A1 | 1/2009 | Griswold et al. | |
| 2009/0108640 A1 | 4/2009 | Wieclawski | |
| 2012/0133188 A1 * | 5/2012 | Wieclawski et al. | 297/378.13 |

OTHER PUBLICATIONS

German Office Action for corresponding Application No. DE 11 2008 004 048.6, mailed Oct. 16, 2012, 5 pages.

* cited by examiner

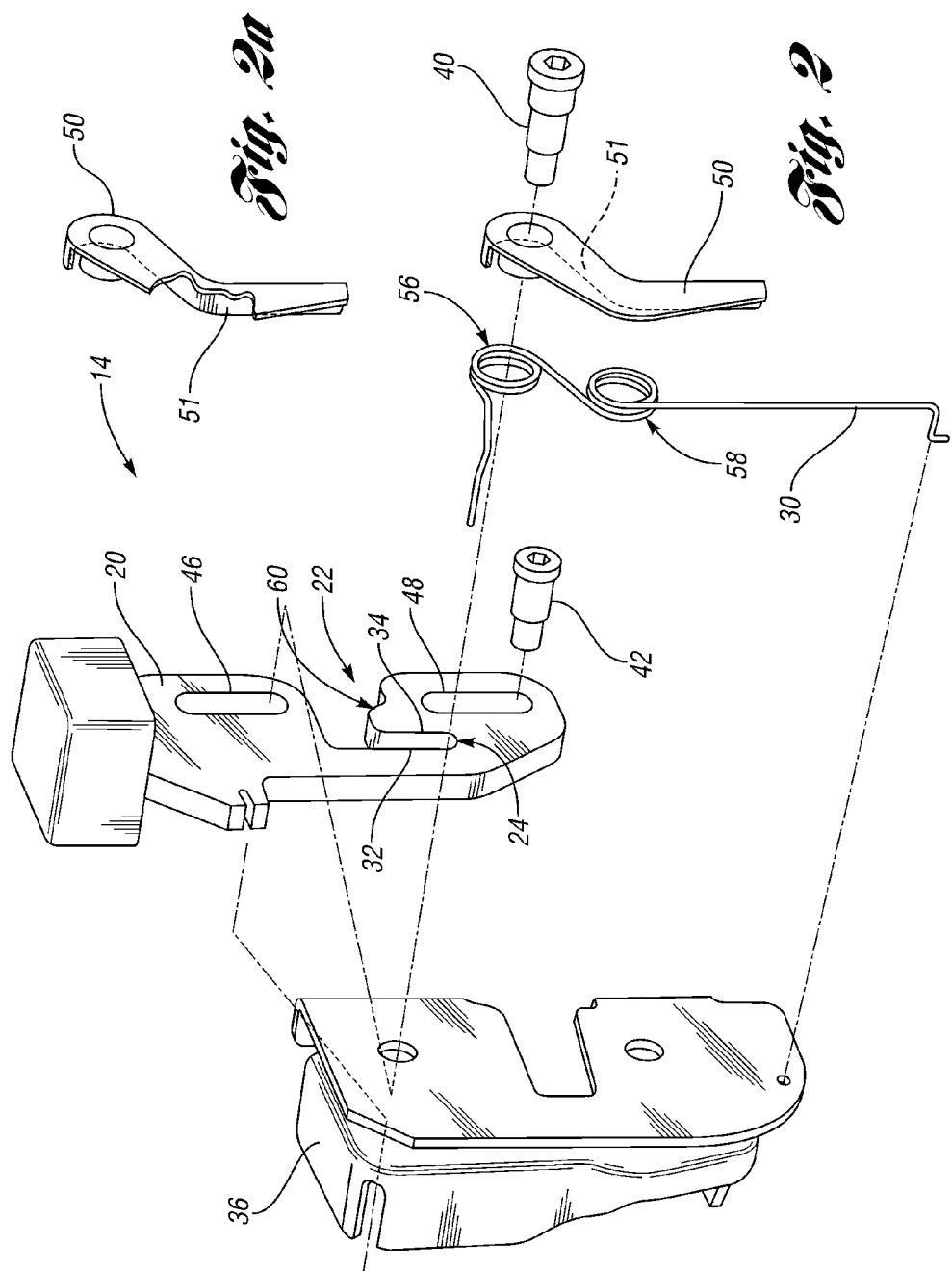

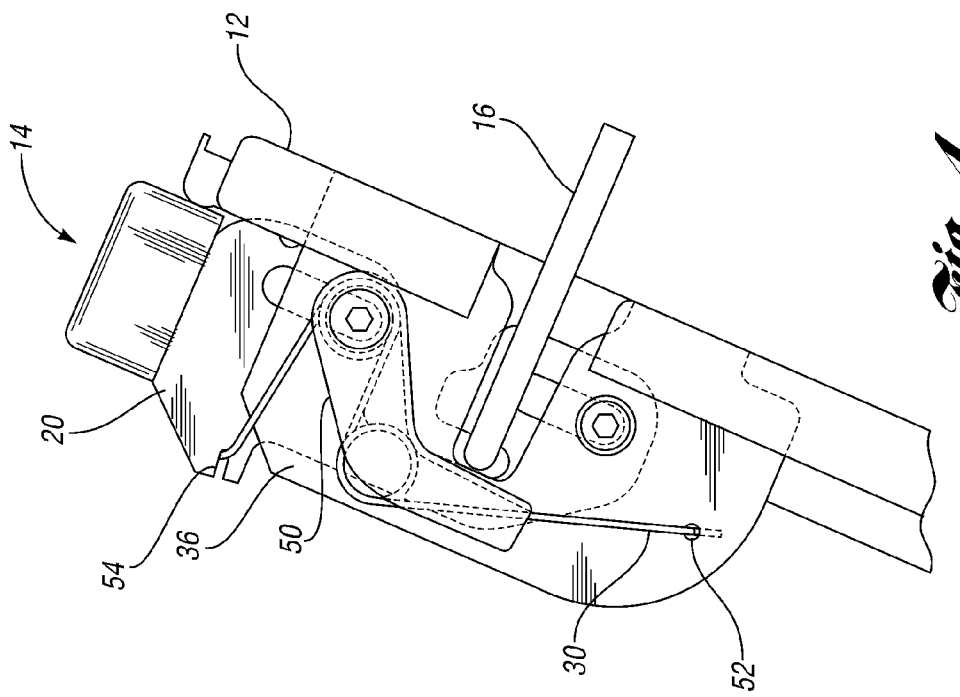
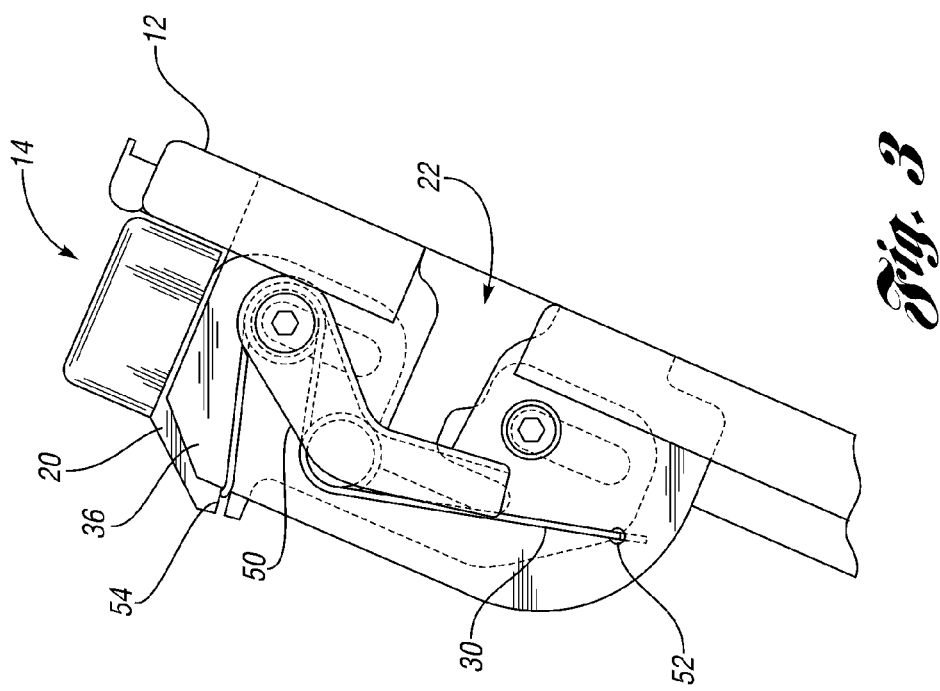

SEAT LATCH

CROSS-REFERENCE TO RELATED APPLICATION

This application is the U.S. national phase of PCT Application. No. PCT/US2008/081399, filed Oct. 28, 2008, the disclosure of which is hereby incorporated by reference in its entirety.

BACKGROUND OF THE INVENTION

1. Field of the Invention

The present invention relates to seat latches of the type used to lock a seat back in a desired position, such as but not limited to the type suitable for locking a second row vehicle seat back in an upright position.

2. Background Art

Vehicle seats and seats used in other environments may include a seat back that is movable between upright and folded positions. A seat latch may be included with the seat back to lock the seat back to a retaining hook or other fixed structure provided for retaining the seat back in the upright position. The seat latch must be designed to retain the seat back against substantial amounts of force during accidents and under other conditions where the forces tend to urge the seat back to the folded position.

A spring or other force applying element may be used to facilitate the desired retention of the seat latch against these higher force conditions, such as by applying forces used to clamp sides of a locking jaw around the retaining hook. The use of a spring to counteract the forces urging the seat to fold over may be undesirable from a design standpoint since it requires a rather robust and costly spring of a size and construction suitable to maintaining the locking jaws in a locked position while counteracting forces that may urge the seat back to the folded position.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 2-2a illustrate an exploded view of a seat latch in accordance with one non-limiting aspect of the present invention;

FIG. 3 illustrates the seat latch in an unlocked position in accordance with one non-limiting aspect of the present invention;

FIG. 4 illustrates the seat latch in a locked position in accordance with one non-limiting aspect of the present invention.

DETAILED DESCRIPTION OF THE PREFERRED EMBODIMENT(S)

Figure 1:
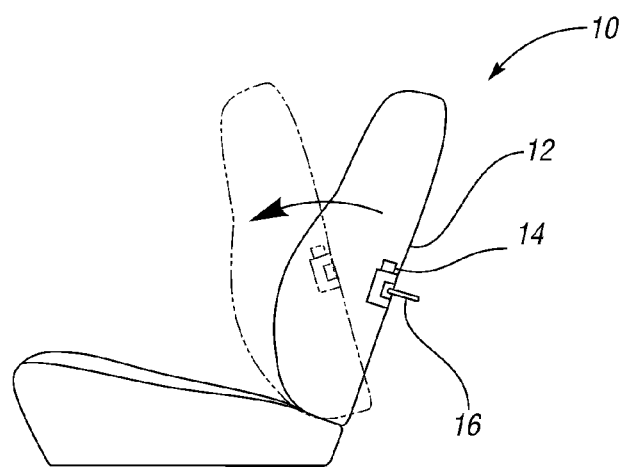
FIGS. 1-1a illustrate a seat restraining system in accordance with one non-limiting aspect of the present invention.
Figure 1A:
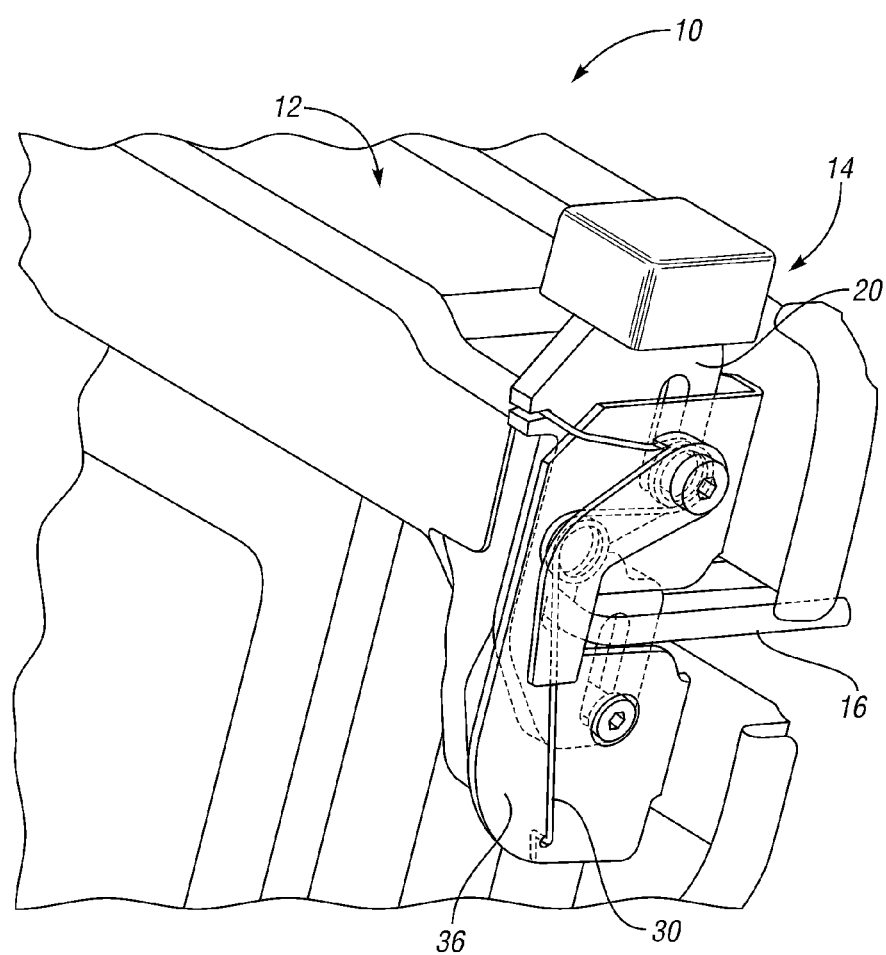

FIGS. 1-1a illustrate a seat restraining system 10 in accordance with one non-limiting aspect of the present invention. The system 10 is shown with respect to retaining a seat back support structure 12 in a upright position with the use of a seat latch 14 configured to lock the seat back 12 relative to a retaining hook 16 included on a vehicle pillar (not shown) or other secure location within a vehicle (not shown), such as the type found in second row seating systems. The seat latch 14 includes a locking fork 20 having an opening 22 within which the retaining hook 16 is received when the seat back 12 is locked in the illustrated upright position.

The configuration of the seat latch 14 causes the locking fork 20 to be lifted upwardly during insertion of the retaining hook 16 as the seat back 12 is folded to the upright position. The retaining hook 16 then becomes seated within a recess 24 included at an end of the opening in the locking fork 20. The seating of the retaining hook 16 below the entry portion of the opening 22 allows the seat latch 14 to lock the seat back 12 to the retaining hook 16 while virtually any amount of force urges the seat back 12 to the folded position, as long as the seat latch 14 remains affixed to the seat back 12 and the retaining hook 16 remains affixed to the vehicle, because a spring 30 used to retain the locking fork 20 in the illustrated locked position is not required to counteract the forces urging the seat back 12 to fold over.

The forces acting on the seat back 12 are directed towards the sides 32, 34 of the recess 24 and from there onto to the locking fork 20 and the attachment features used to secure the seat latch 14 to the seat back 12. For exemplary purposes, the seat latch 14 may be included within a housing 36 that is affixed to the seat back 12 with welding, rivets, screws, or other suitable fastenings, allowing the seat back 12 to be retained in the upright position as long as these connecting features keep the seat latch 14 connected to the seat back 12. In this manner, the spring 30 used by the present invention is simply required to retain the locking fork 20 in the upright position and need not bear the forces urging the seat back 12 to fold over.

FIG. 2 is an exploded view of the seat latch 14 and shows the shape of the recess 24 into which the retaining hook 16 is seated. From the seated position, forces acting on the retaining hook 16 are translated to the locking fork 20 and the housing 36 by first and second bolts 40, 42 inserted within a pair of channels 46, 48 used to guide the locking fork 20 as it moves between locked and unlocked positions. The movement of the seat latch 14 between the unlocked and locked positions is shown in FIGS. 3-4 where FIG. 3 illustrates the locking fork 20 in the unlocked position and FIG. 4 illustrates the locking fork 20 in the locked position.

The bolts 40, 42 may be helpful in limiting the number of moving parts required to support the operations contemplated by the present invention to those necessary to facilitating the upward, lifting motion used to transition the seat latch 14 from the unlocked to the locked position and the downward motion used to transition the seat latch 14 from the locked to the unlocked position. Optionally, a lever arm 50 having a shoulder 51 (see FIG. 2a) may be included to facilitate tensioning of the spring 30 as the seat back 12 is folded to the upright position in a manner that induces the desired upward, lifting motion used to lock the seat back 12.

The lever arm 50 covers a portion of the spring 30 that engages the retaining fork 20 and pivots about the first bolt 40 when the seat back 12 is moved between the unlocked and locked positions. As shown in the progression from FIG. 3 to FIG. 4, the lever arm 50 moves forwardly as the seat back 12 is moved rearwardly toward the retaining hook 16. A bottom end of the spring 30 is journaled within a opening 52 in the housing 36 and an opposite end is clipped within a connecting slot 54 of the locking fork 20. The arrangement, aided by the lever arm 50, causes the increased tension created on the spring 30 when the retaining hook 16 is inserted to urge the locking fork 20 upwardly.

As the retaining hook 16 presses against the lever arm 50, the spring tension increases until a top end of the spring 30 pivots about the first bolt 40 and the locking fork 20 is lifted into the position shown in FIG. 4. Once in the locked position, coils 56, 58 on the spring continue to apply pressure against the lever arm 50, resulting in a continuous uplifting force being applied to the locking fork 20 that insures the seat latch 14 remains locked. Since the locking fork 20 is the only element that is able to move in response to the spring pressure, it is retained in the position shown in FIG. 4 until a greater force presses it back down to the position shown in FIG. 3.

The tensioning of the spring 30, and coils 56, 58, may be selected and designed to control the amount of downward force required to transition the locking fork 20 from the locked to the unlocked position. This may include changing the shape, size, material composition, number of coils, and other features of the spring 30 so that a vehicle occupant can simply press on a top of the locking fork in order to force the locking fork back to the unlocked position. The illustrated first and second coils 56, 58 are shown merely for exemplary purposes and to provide one measure for balancing the amount of force require to lock and unlock the seat latch 14. The opening 52 and its positioning within the housing 36 can also be adapted to control the spring tensioning. Multiple openings may be included in the housing 36 to allow a user to personally select the amount of force required to unlock the seat latch 14 by switching the opening 52 within which the spring 30 is retained.

The shape of the lever arm 50 may be angled in a downward direction relative the first bolt 40 about which it pivots to facilitate entry of the retaining hook 16 into the opening 22 and the recess 24. This angled portion causes the spring 30 to generate the tensioning that urges the locking fork 20 to be uplifted as the retaining hook 16 approaches a back end of the opening above a top of the recess 24. The tensioning causes the locking fork 20 to move upwardly so that a bottom side 60 of the opening rides along a bottom side of the retaining hook 16 until the retaining hook 16 is positioned over the recess 24 and the spring 30 is able to lift the locking fork 20 above the bottom of the retaining hook 16.

Figure 6:
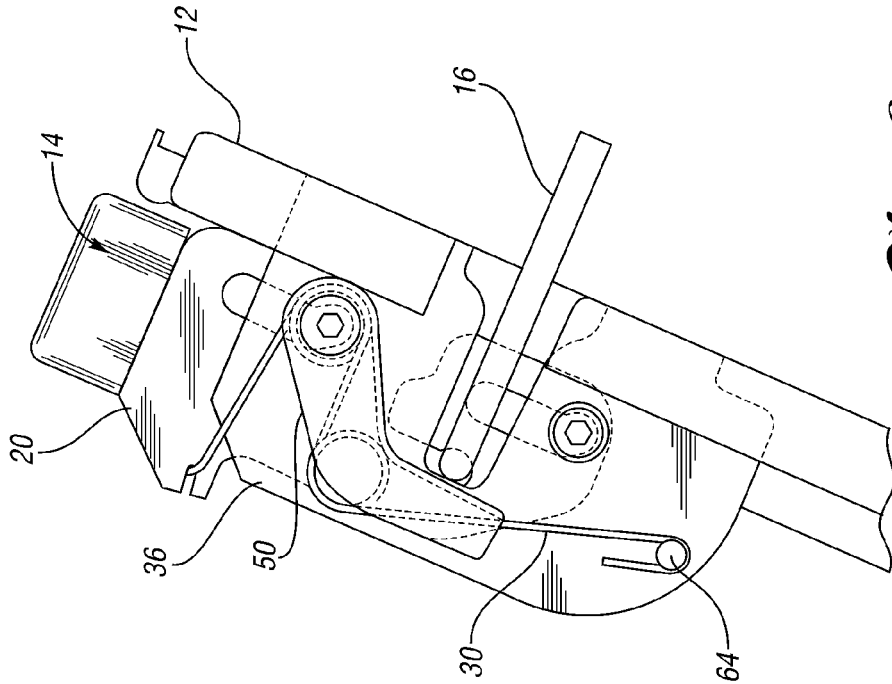
FIG. 6 illustrates the seat latch in a locked position in accordance with one non-limiting aspect of the present invention.
Figure 5:
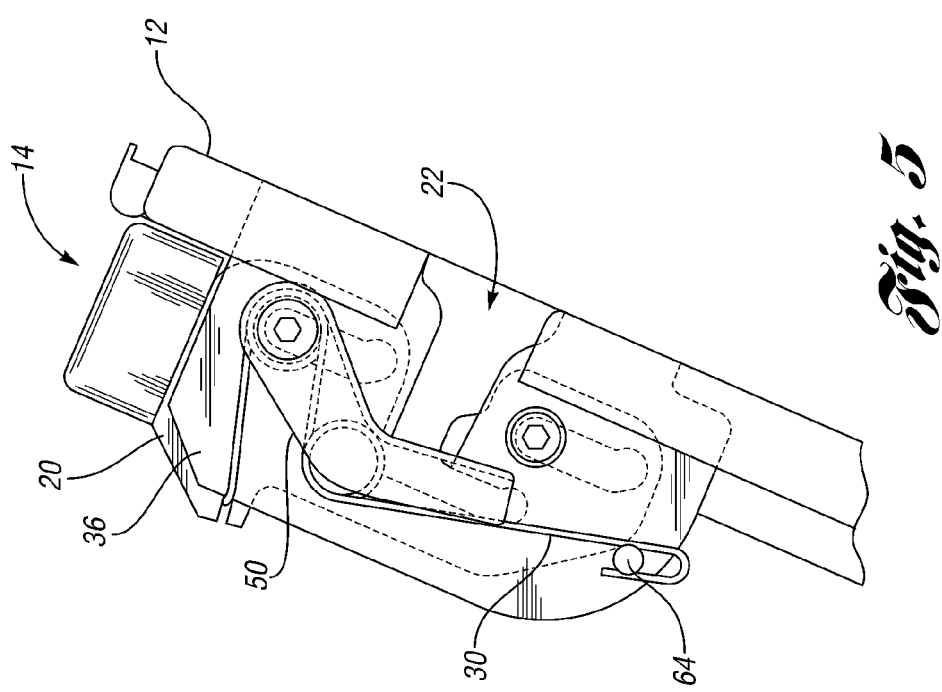
FIG. 5 illustrate the seat latch in an unlocked position in accordance with one non-limiting aspect of the present invention.

FIGS. 5 and 6 illustrate a pin retention arrangement for attaching the spring 30 to the housing 36 instead of journaling the spring 30 within the opening 52 as shown in the figures above. In this arrangement, the bottom end of the spring 30 is hooked around a pin 64 so that it can slide upwardly when the lever arm 50 is moved forwardly by the retaining hook 16. This produces tensioning in a manner similar to that described above where the tensioning induces the other end of the spring 30 to the lift the locking fork 20 into the locked position.

After the locking fork 20 is lifted to the locked positions shown in FIGS. 4 and 6, it can be lowered to the unlocked positions shown in FIGS. 3 and 5 when sufficient force is applied to the top of the locking fork 20. The top of the locking fork 20 may protrude above a top of seat back and/or seat back cushioning to facilitate its actuation. Once in the unlocked position, the opening 22 of the locking fork 20 is again positioned below the retaining hook 16. In this position, the spring 30 is compressed and held forward by the retaining hook 16 being positioned above the recess 24. Unless force from a user or a mechanical device, such as but not limited to a spring or motor, folds the seat forwardly, the seat latch 14 will re-lock as soon as the force is removed from the top of the locking fork 20.

Some coordination is required between the force being applied to unlock the locking fork 20 and the force being applied to fold the seat back 12 in order to move the seat from the locked position. Manual application of both forces is one process contemplated for insuring the desired coordination. Another method may include the use of spring or other element to tension the seat back 12 in a manner that urges it to fold forwardly as soon as the locking fork 20 is unlocked. This, optionally continuous, force can be used with manual or mechanical depression or lowing of the locking fork 20 to provide an automated process for the folding the seat back 12.

One aspect of the present invention relates to locking a seat back or other feature in a desired position with reliance on a spring or other flexible element and without requiring the flexible element to bear the loads required to prevent the seat back from folding when locked. Another aspect of the present invention utilizes the spring to continuously bias the locking fork against the retaining hook in a manner that can be helpful in preventing rattles and other noises from being produced when the vehicle is moving. Optionally, the bottom portions of the recess 24 and the channels 46, 48 (see FIGS. 5 and 6) may be angled rearwardly to produce a diagonal that shifts the locking fork 20 forwardly to further limit the likelihood of the seat latch rattling.

The foregoing invention is predominately described with respect to retaining a seat back in an upright position for exemplary purposes. The present invention is not intended, unless otherwise noted, to be solely limited to vehicle seating system, or second row vehicle systems, and fully contemplates it use and application within any seating arrangement where it may be desirable to retain or lock a seat back or other movable portion of seat in an upright position or other position.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat latch for retaining a seat back that is foldable between down and upright positions in the upright position by locking the seat back to a retaining hook, the seat latch comprising:

a locking fork having an opening on a rearward side that extends forwardly to a retaining recess, the opening being configured to receive the retaining hook, and the retaining recess having a depth and size sufficient to seat the retaining hook below the opening; and a spring configured to experience increased tension when the retaining hook travels forwardly relative to the locking fork, such that the spring is able to lift the locking fork from an unlocked position to a locked position, the unlocked position corresponding with a top of the retaining recess being below a bottom of the retaining hook and the locked position corresponding with the top of the retaining recess is being lifted above the bottom of the retaining hook.

2. The seat latch of claim 1 wherein the spring is configured to exert pressure against the retaining hook, resulting in an uplifting force being applied to the locking fork that is sufficient to maintain the locking fork in the locked position, when the retaining hook is received in the retaining recess, until a greater force presses the lifted locking fork down to the unlocked position.

3. The seat latch of claim 1 wherein the first end of the spring is configured to lift the locking fork when the retaining hook moves a second end of the spring forwardly.

4. The seat latch of claim 1 further comprising a lever arm covering a portion of the spring, wherein an inside shoulder of the lever arm is configured to press against the spring when the retaining hook contacts an outside of the lever arm.

5. The seat latch of claim 1 further comprising first and second bolts extending through first and second channels, respectively, that are included within the locking fork, the first and second bolts securing the locking fork to a housing within which the locking fork actuates between the locked and unlocked positions.

6. The seat latch of claim 5 wherein the recess has a bottom that is angled rearwardly for receiving the retaining hook, and the first and second channels each have a bottom that is angled rearwardly for receiving a respective bolt.

7. The seat latch of claim 1 wherein the first end of the spring is clipped into a top end of the locking fork and the other end of the spring is inserted within an opening in a housing used to support the locking fork.

8. A seat latch configured for retaining a seat with respect to a stationary retaining hook, the seat latch comprising:
 a housing having opposed first and second side walls and matching top and bottom openings within each side wall;
 a locking fork positioned between the side walls and having top and bottom channels proximate the top and bottom openings, respectively, of each side wall, the locking fork further having an opening in a rearward side of the locking fork that extends forwardly to a recess;
 a top fastener and a bottom fastener respectively extending through the top and bottom openings and the top and bottom channels;
 a pivoting lever arm attached to an upper portion of the housing above the opening of the locking fork, the lever arm extending over at least a portion of the opening of the locking fork such that receipt of the retaining hook in the opening of the locking fork causes the lever arm to pivot forwardly; and
 a spring having first and second ends, the first end being connected to an upper portion of the locking fork and the second end being connected to a lower portion of the housing, the spring being positioned within a forward pivot path of the lever arm and being configured to experience increased tension during receipt of the retaining hook in the opening of the locking fork that causes the first end to lift the locking fork upwardly into a locked position when the retaining hook is positioned over the recess.

9. The seat latch of claim 8 wherein the spring includes at least one coil.

10. The seat latch of claim 9 wherein at least one coil is positioned around the top fastener.

11. The seat latch of claim 8 wherein the second end of the spring extends through an opening in the housing.

12. The seat latch of claim 8 wherein the second end of the spring is hooked around a pin included within the housing.

13. A retention system for use with a seat having a seat back that is foldable between upright and folded positions, the system comprising
 a stationary, retaining element; and
 a seat latch attachable to the seat back, the seat latch including a locking fork with an opening leading to a recess and a lifting element, the lifting element being configured to linearly lift the locking fork from an unlocked position to a locked position when the seat back is moved from the folded position to the upright position, the unlocked position corresponding with a top of the recess being below a bottom of the retaining element and the locked position corresponding with the top of the recess being lifted above the bottom of the retaining element;
 wherein the lifting element is configured to maintain the locking fork in the locked position until a sufficient force presses down on the locking fork, and the lifting element is configured to maintain the locking fork in the locked position without having to bear forces used to move the seat back to the folded position.

14. The system of claim 13 wherein the lifting element is a spring and the spring is configured to experience an increase in tension during receipt of the retaining element in the opening of the locking fork, such that the spring is able to lift the locking fork to the locked position.

15. The system of claim 14 wherein the spring is configured to bias a bottom side of the opening against a bottom side of the retaining element during receipt of the retaining hook in the opening of the locking fork.

16. The system of claim 13 wherein the lifting element is a non-resilient element under customary loads.

17. The system of claim 13 wherein the lifting element is a spring having one end attached to the locking fork and another end attached to a housing within which the lifting element is liftable.

18. The system of claim 17 further comprising two fasteners extending though corresponding guide channels included within the locking fork, the fasteners securing the locking fork to the housing, the locking fork being liftable relative to the two fasteners.

19. The system of claim 18 wherein the spring includes two separate coils.

20. The system of claim 19 wherein one of the coils is pivotable around one of the fasteners so that the spring is displaceable angularly.

* * * * *